April 8, 1930.  E. B. MILLER  1,753,615
AUTOMOBILE HEATER
Filed Nov. 21, 1925  2 Sheets-Sheet 1

Inventor
Earl Balfour Miller
By David Rines
Attorney

April 8, 1930.  E. B. MILLER  1,753,615
AUTOMOBILE HEATER
Filed Nov. 21, 1925    2 Sheets-Sheet 2

Inventor
Earl Balfour Miller
By
David Rines
Attorney

Patented Apr. 8, 1930

1,753,615

UNITED STATES PATENT OFFICE

EARL BALFOUR MILLER, OF BRATTLEBORO, VERMONT, ASSIGNOR TO MASTERCRAFTS CORPORATION, OF BRATTLEBORO, VERMONT, A CORPORATION OF VERMONT

AUTOMOBILE HEATER

Application filed November 21, 1925. Serial No. 70,551.

The present invention relates to heaters, and more particularly to devices for heating automobiles, and its object is to improve upon present-day heaters.

Figure 1:
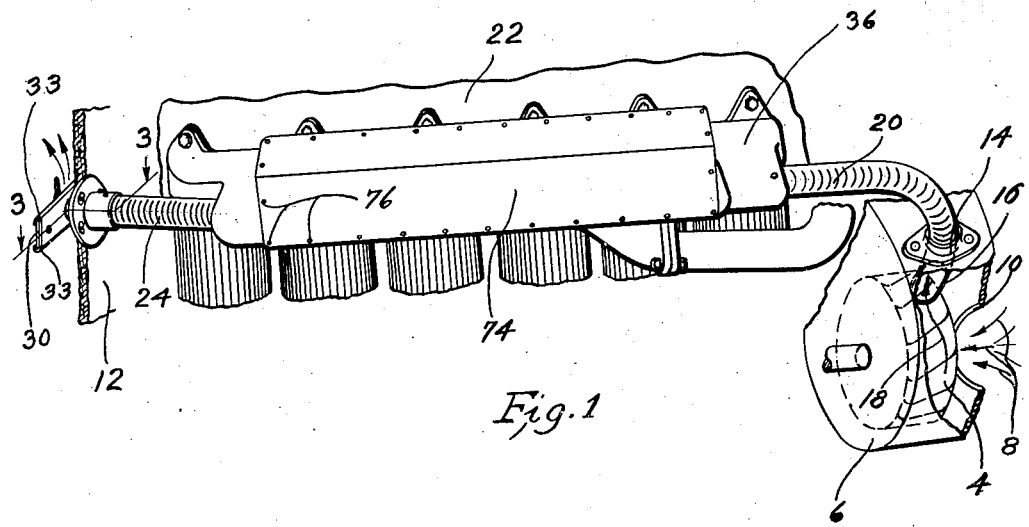
Figure 2:
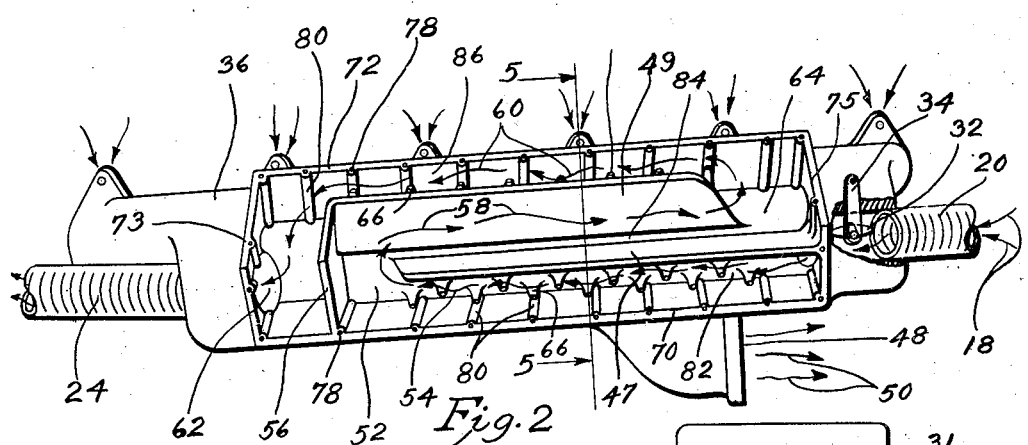
Figure 3:
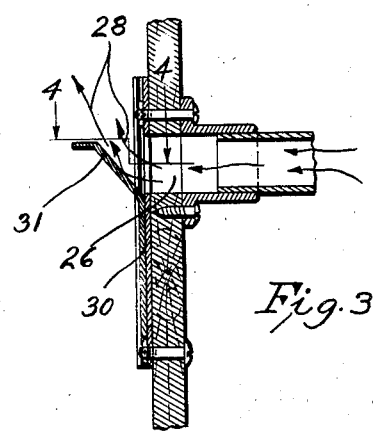
Figure 4:
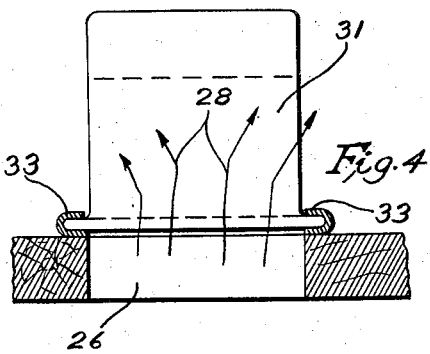
Figure 5:
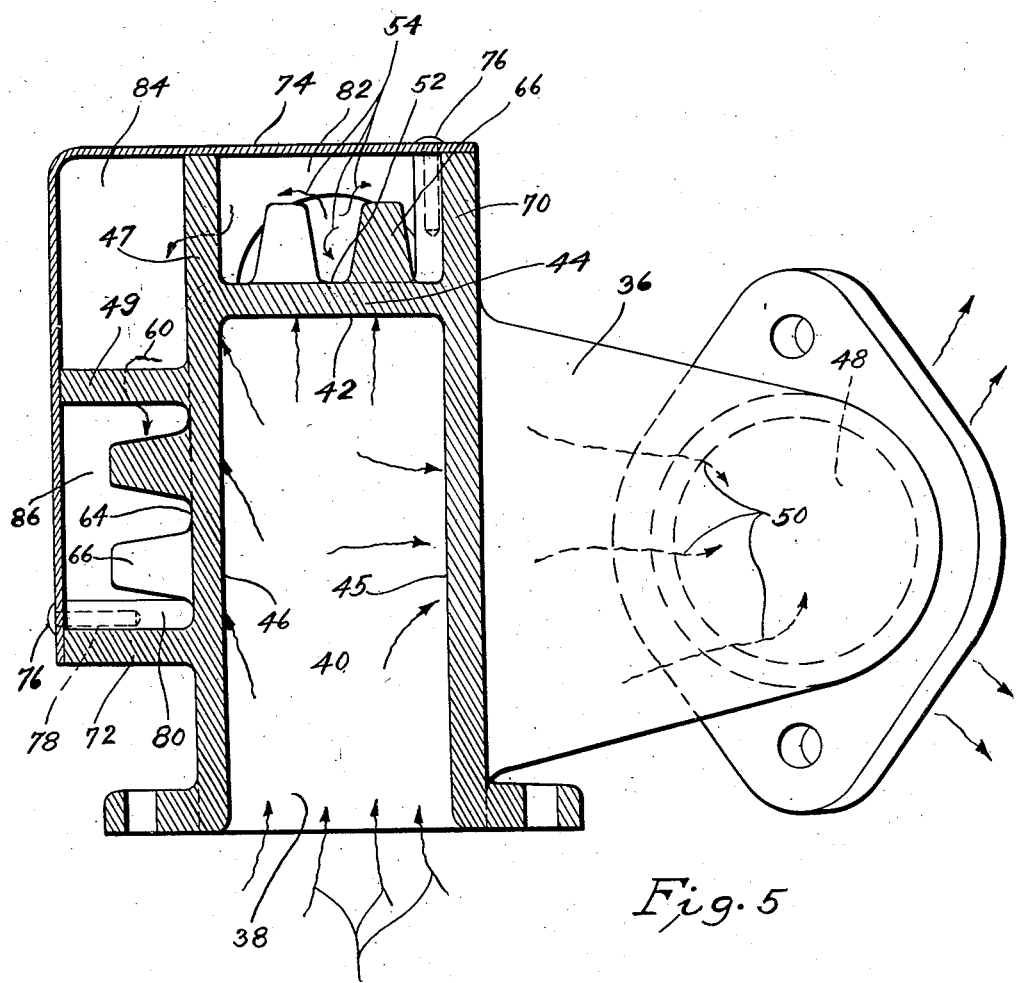
Figure 6:
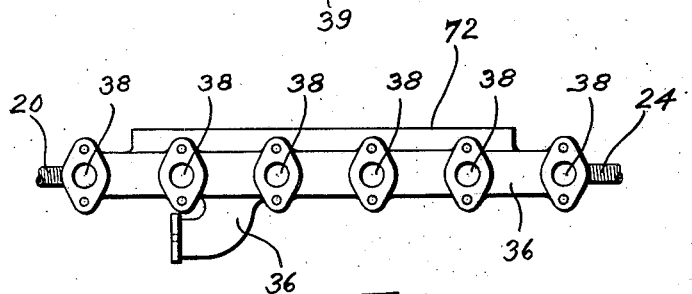

The invention will be explained in connection with the accompanying drawings, in which Fig. 1 is a fragmentary view of an automobile engine equipped with a preferred embodiment of the invention; Fig. 2 is a similar view, partly in section, shown detached from the engine, and with the cover plate removed; Fig. 3 is a section taken upon the line 3—3 of Fig. 1, looking in the direction of the arrows, upon a larger scale; Fig. 4 is a still further enlarged section, taken upon the line 4—4 of Fig. 3, looking in the direction of the arrows; Fig. 5 is a section taken upon the line 5—5 of Fig. 2, looking in the direction of the arrows, also enlarged; and Fig. 6 is a rear view.

As the invention is more particularly adapted for use with automobiles like those manufactured by the Franklin Motor Car Company, an engine of this type is diagrammatically shown in Fig. 1. This engine, as is well known, is adapted to be air-cooled by a fan 4 that is positioned in a housing 6 at the forward part of the engine. Air is indicated by arrows 8 as entering the housing 6 through an opening 10. It will not be necessary to describe this well known structure further than to state that the fan 4 supplies not only the air for cooling the engine, but also, according to the present invention, the air for heating the automobile car or tonneau, the dash or front wall of which is indicated at 12. To this end, the fan housing 6 is perforated at 14. The perforation 14 is, for simplicity, shown at the top of the housing, though in practice, it will be at the side of the housing. Into the perforation extends a scoop-shaped member 16 for scooping in the air from the fan, as indicated by the arrow 18, and directing it towards and into a flexible pipe 20. The air is then forced by the fan past the exhaust manifold 22 of the engine and into another flexible tube 24, through which it is guided into the tonneau by way of an opening 26, as indicated by the arrows 28. A movable shutter 30 may be moved up and down by the foot, between guides 33, to regulate the amount of heated air that enters the tonneau and is provided with a deflector 31 for deflecting the heat upward or any other desired direction according to its angular position of adjustment. The shutter 30 may be manipulated to shut off all the heat, if desired. Preferably, however, especially in summer, the heat may be shut off by means of a butterfly valve 32, shown more particularly in Fig. 2 at the rear end of the flexible tube 20. By means of a handle 34, this valve may be closed to shut off the air supplied by the fan 4, and thus prevent its traveling past the exhaust manifold 22. The effectiveness of the heater may be increased by means of a grille cover (not shown).

According to the preferred embodiment of the present invention that is herein illustrated and described, the standard exhaust manifold is removed and a casting 36 substituted. The casting 36 is provided with a plurality of openings 38, each connected with one of the cylinders of the engine and through which the exhaust gases are adapted to travel, as indicated by the arrows 39 of Fig. 5, into a chamber 40 and against the interior side 42 of a wall 44 of this chamber. The side walls 45 and 46 of the chamber 40 are less heated than the wall 44 because the waste gases merely travel past the walls 46, but they strike directly against the wall 44. The wall 44 is thus the hottest part of the chamber 40. After striking the wall 44, the gases are deflected and travel out into the atmosphere by way of an opening 48 that communicates with the chamber 40, as indicated by the arrows 50.

The air that is driven by the fan 4 into the tube 20 is first caused to travel past the external side 52 of the wall 44, as shown by the arrows 54. The coldest air is thus first brought into contact with the hottest part of the walls of the exhaust manifold. This results in a quicker heating of the air. After traveling nearly the whole length of the exhaust manifold, the air is deflected by a wall 56 and caused to travel in the opposite direction, as indicated by the arrows 58. At the end of the return travel, the air is again deflected, and caused to traverse a path parallel to the original direction of travel, as indicated by the arrows 60, after which it enters the tube 24 by way of an opening 62. During its later stages of travel, the air becomes further heated by contact with the wall 46 and other walls 47 and 49 of the casting 36 that are heated less intensely than the wall 44. The zig-zag path traversed by the air is nearly three times as long as the length of the exhaust manifold, affording the air a greater opportunity to come intimately into contact with the heated walls. To the further attainment of this end, the external sides 52 and 64 of the walls 44 and 46 over which the air travels and which are subjected to the action of the exhaust gases are provided with projecting portions 66 for collecting the heat of the exhaust gases and radiating it to the air to be heated.

The travel of the gases is confined to a chamber disposed longitudinally of the exhaust manifold and comprising the walls 44 and 46, walls 70, 72, 73 and 75, and an angular cover 74 that is secured to the walls 70 and 72 by means of rivets or other fastening members 76. The walls 73 and 75 are referred to hereinafter as end walls or limiting walls. The members 76 extend through the cover plate 74 and into openings 78 provided upon projections 80 of the walls 70 and 72. This chamber is divided into three longitudinally disposed sub-chambers 82, 84 and 86 arranged in zig-zag form and through which the air pursues its above-described zig-zag path, in sequence. The sub-chamber 82 is formed between the walls 70 and 47; the sub-chamber 84, between the walls 47 and 49; and the chamber 86 between the walls 49 and 72.

It will be understood that the invention is not restricted to the exact embodiment thereof that is illustrated and described herein but that modifications may be made by persons skilled in the art without departing from its spirit and scope, as defined by the appended claims.

What is claimed is:

1. A heating device comprising a manifold for waste heated gases and provided with a wall, means forming an external chamber with one side of the wall, two walls disposed longitudinally of the first-named wall dividing the external chamber into three longitudinally disposed sub-chambers connected together in zig-zag relation, one of the sub-chambers having a front opening, a second sub-chamber having a rear opening, and the third sub-chamber being disposed between the other two sub-chambers, air to be heated being adapted to travel through the front opening into the said one sub-chamber in one direction, then in substantially the opposite direction through the third sub-chamber, then in substantially the said one direction through the second sub-chamber, and finally out through the rear opening.

2. A heating device for use in an automobile provided with an engine having a manifold, a plurality of walls forming with the wall of the manifold a chamber, and two walls connecting the chamber walls to divide the chamber into three sub-chambers connected together in zig-zag relation, two of the sub-chambers each having an opening and the third sub-chamber being disposed between the said two sub-chambers, and means for forcing air to be heated through one of the openings into one of the said two sub-chambers, then through the third sub-chamber, then through the other of the said two sub-chambers, and finally out through the other opening.

3. A heating device for use in an automobile provided with an engine having a manifold, a plurality of walls forming with the wall of the manifold, a chamber disposed longitudinally of the manifold, and two longitudinally disposed walls connecting the chamber walls to divide the chamber into three longitudinally disposed sub-chambers connected together in zig-zag relation, one of the sub-chambers having a front opening, a second sub-chamber having a rear opening, and the third sub-chamber being disposed between the other two sub-chambers, air to be heated being adapted to travel through the first-named opening into the said one sub-chamber in one direction, then in substantially the opposite direction through the third sub-chamber, then in substantially the said one direction through the second sub-chamber, and finally out through the second-named opening.

4. A heating device comprising a manifold for waste heated gases provided with a wall, means forming an external chamber with the outside of the wall, the external chamber being divided into sub-chambers connected together into zig-zag relation and each sub-chamber being formed in part by a portion of the wall, the waste heated gases being adapted to travel into the manifold against that portion of the inside of the wall corresponding to the portion of the said outside of the wall that forms part of one of the sub-chambers to heat the said portion of the said inside of the wall more than other parts of the manifold, air to be heated being adapted to travel first through one sub-chamber and then through the remainder of the external chamber.

5. A heating device comprising a manifold provided with a wall forming an internal chamber for waste heated gases, means comprising an angular cover forming an external chamber with the outside of the wall, the said outside of the wall having two end walls and longitudinally disposed walls forming three longitudinally disposed sub-chambers of the external chamber connected together in zig-zag relation, one of the sub-chambers comprising one of the end walls and having a front opening, another of the sub-chambers comprising the other end wall and having a rear opening, and means for forcing air to be heated first through the said one sub-chamber in one direction, then in substantially the opposite direction through the third sub-chamber, then in substantially the said first direction through the said other sub-chamber, and finally out through the rear opening.

6. A heating device having, in combination, a heated wall, means for directing exhaust gases directly against parts of the wall and indirectly against other parts of the wall to heat the first-named parts of the wall hotter than the said other parts, a wall joined to and extending out from the heated wall at the junction between the hotter parts and the other parts, whereby the hotter parts of the heated wall are on one side of the joining wall and the other parts are on the other side of the joining wall, and means for forcing air to be heated back and forth over the heated wall on the other side thereof relative to said exhaust gases, first over the hotter parts of the heated wall on the said one side of the joining wall, and then over the less hot parts of the heated wall on the said other side of the joining wall.

7. A heating device comprising a manifold for waste heated gases and provied with a wall, means forming an external chamber with one side of the wall, a wall dividing the external chamber into sub-chambers, one sub-chamber having a part of the first-named wall and the other sub-chamber having another part of the first-named wall, the waste heated gases being adapted to travel into the manifold first against the first-named part of the first-named wall and later towards other parts of the manifold, whereby the said first-named part becomes more heated than other parts of the first-named wall, and means for forcing a fluid to be heated first through the said one sub-chamber and then through the said other sub-chamber.

In testimony whereof, I have hereunto subscribed my name.

EARL BALFOUR MILLER.